Jan. 23, 1962　　　A. C. BEHRINGER　　　3,017,828
DOCTOR BLADE MECHANISM
Filed March 12, 1959　　　　　　　　　　　　　9 Sheets-Sheet 1

INVENTOR.
ALFRED C. BEHRINGER
BY
his. ATTORNEYS.

Jan. 23, 1962  A. C. BEHRINGER  3,017,828
DOCTOR BLADE MECHANISM
Filed March 12, 1959  9 Sheets-Sheet 3

INVENTOR.
ALFRED C. BEHRINGER
BY
his ATTORNEYS.

Jan. 23, 1962  A. C. BEHRINGER  3,017,828
DOCTOR BLADE MECHANISM
Filed March 12, 1959  9 Sheets-Sheet 4

INVENTOR.
ALFRED C. BEHRINGER
BY
his ATTORNEYS.

INVENTOR.
ALFRED C. BEHRINGER
BY
his ATTORNEYS.

Jan. 23, 1962    A. C. BEHRINGER    3,017,828
DOCTOR BLADE MECHANISM
Filed March 12, 1959    9 Sheets-Sheet 6
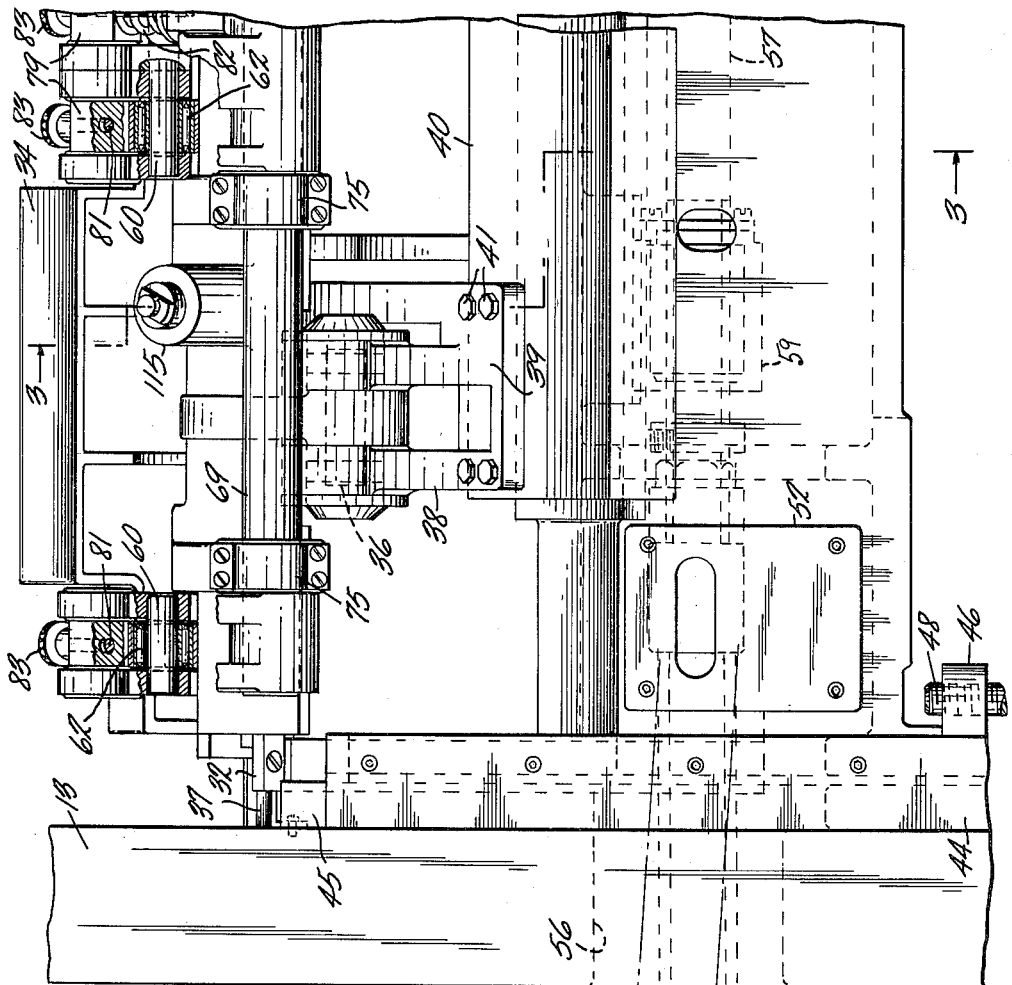
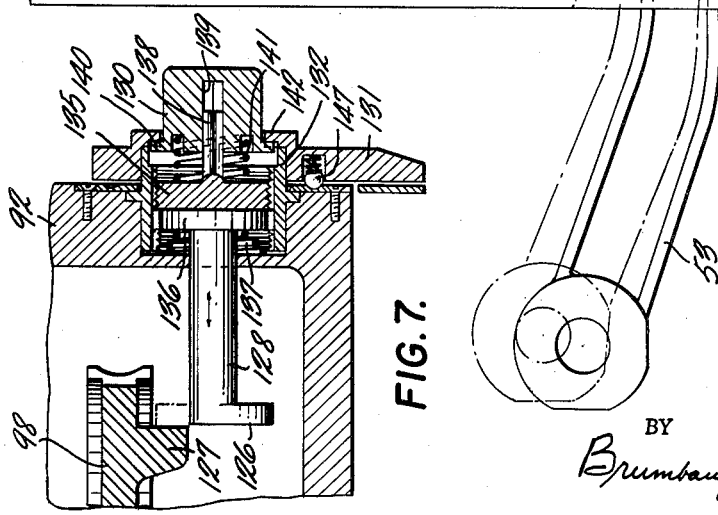
FIG. 6A.
FIG. 7.
INVENTOR.
ALFRED C. BEHRINGER
BY
his ATTORNEYS.

Jan. 23, 1962

A. C. BEHRINGER 3,017,828

DOCTOR BLADE MECHANISM

Filed March 12, 1959

INVENTOR.
ALFRED C. BEHRINGER
BY
his ATTORNEYS.

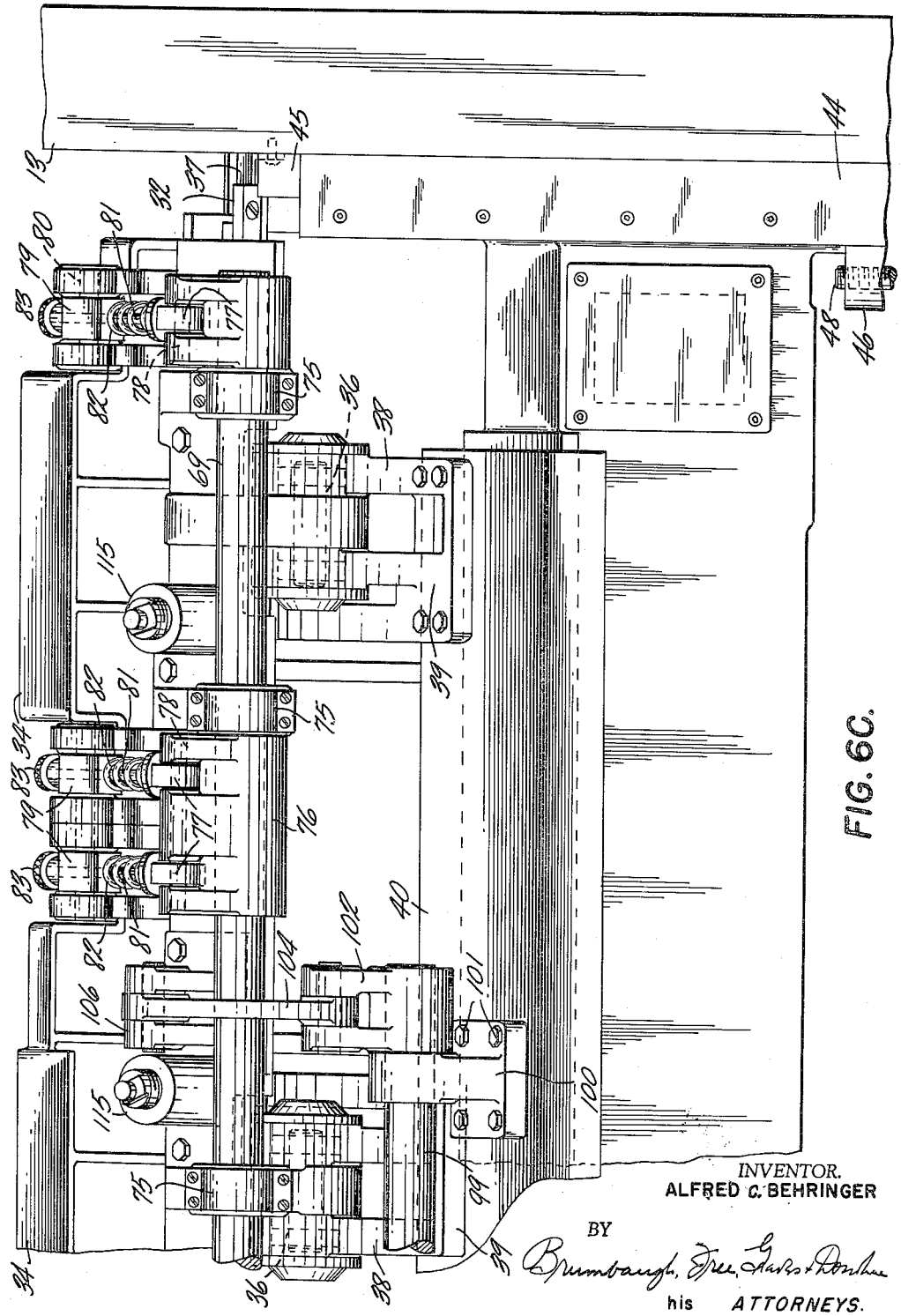

United States Patent Office 3,017,828
Patented Jan. 23, 1962

3,017,828
DOCTOR BLADE MECHANISM
Alfred C. Behringer, Ringwood, N.J., assignor, by mesne assignments, to Miehle-Goss-Dexter, Incorporated, Chicago, Ill., a corporation of Delaware
Filed Mar. 12, 1959, Ser. No. 798,923
20 Claims. (Cl. 101—157)

This invention relates to an improved doctor blade mechanism and to a method of adjusting and locking a doctor blade in operative position relative to a cylinder of a press.

In most conventional doctor blade mechanisms of rotary printing presses, the doctor blade is pre-set and locked in a relatively heavy doctor blade holder. The doctor blade is carefully adjusted in the holder to properly orient the blade relative to the holder and to insure that a proper amount of the doctor blade adjacent its wiping edge protrudes from the holder. In fact, so critical is the lock-up of the blade in the holder that it is customary to pre-set the doctor blade in the heavy holder at the doctor blade grinder and to grind the blade while clamped in the holder. This, of course, necessitates handling of the heavy holder whenever it is necessary to grind the blade.

The doctor blade holder, in turn, is adapted to be clamped in a frame of the printing press. The adjustment of the doctor blade in the holder is a critical setting which influences the quality of the tone reproduction, and this adjustment is usually attended to before the holder is clamped in the frame. Once the holder is clamped in the frame, all further adjustments necessary to bring the doctor blade into proper position with respect to the printing cylinder, such as the adjustments to insure parallelism and the like, are accomplished by adjusting the frame in which the holder is clamped. In large printing presses, the frame is usually supported on two adjustable pivots with the result that these adjustments of the frame are time consuming and are susceptible to many human errors. Warping of the frames and distorted or damaged doctor blade holders only add to the setting difficulties.

The principal object of the present invention is to provide an improved doctor blade mechanism in which the doctor blade can be adjusted in proper operative position relative to a cylinder of a machine more conveniently and effectively than is possible in conventional doctor blade mechanisms.

Another object of the present invention is to provide an improved method of adjusting and locking a doctor blade in operative position relative to a cylinder of a machine.

The first of these objects is achieved in the present invention by a doctor blade mechanism in which the doctor blade is clamped directly in an adjustable frame of the doctor blade mechanism without the use of a detachable holder. The frame is pivotally mounted by a plurality of fixed pivots arranged on a common axis, eliminating the necessity for adjustment of the pivots and providing a superior type of mounting for the frame. The adjustment of the frame and the doctor blade mechanism carried thereby relative to the cylinder is made initially when the press is set up in operation, and thereafter only adjustments of the blade relative to the frame are necessary. Provision is made in the present invention for moving the frame toward and away from the cylinder of the machine to facilitate the proper adjustment of the doctor blade relative to the cylinder. In addition, novel means is provided for controlling the locking and unlocking action of the clamping mechanism so that the doctor blade can be readily locked and unlocked or, if desired, loosely clamped so as to afford a slipping action of the blade relative to the clamping mechanism to permit precise final adjustments and orientation of the doctor blade.

As an added feature of the doctor blade mechanism of the present invention, an adjustable stop device is provided. This adjustable stop plays an important role in the precise setting of the doctor blade. It also facilitates relocation of the adjustable frame with precision if it becomes necessary for any reason to move the adjustable frame from its previously adjusted position.

The doctor blade mechanism of the present invention makes possible an improved method of adjusting and locking the doctor blade in operative position relative to the cylinder of the machine. In this improved method the cylinder itself helps in properly orienting and finally adjusting the doctor blade in the doctor blade mechanism.

For a complete understanding of the present invention, reference may be made to the detailed description which follows and to the accompanying drawings, in which.

Figure 2:
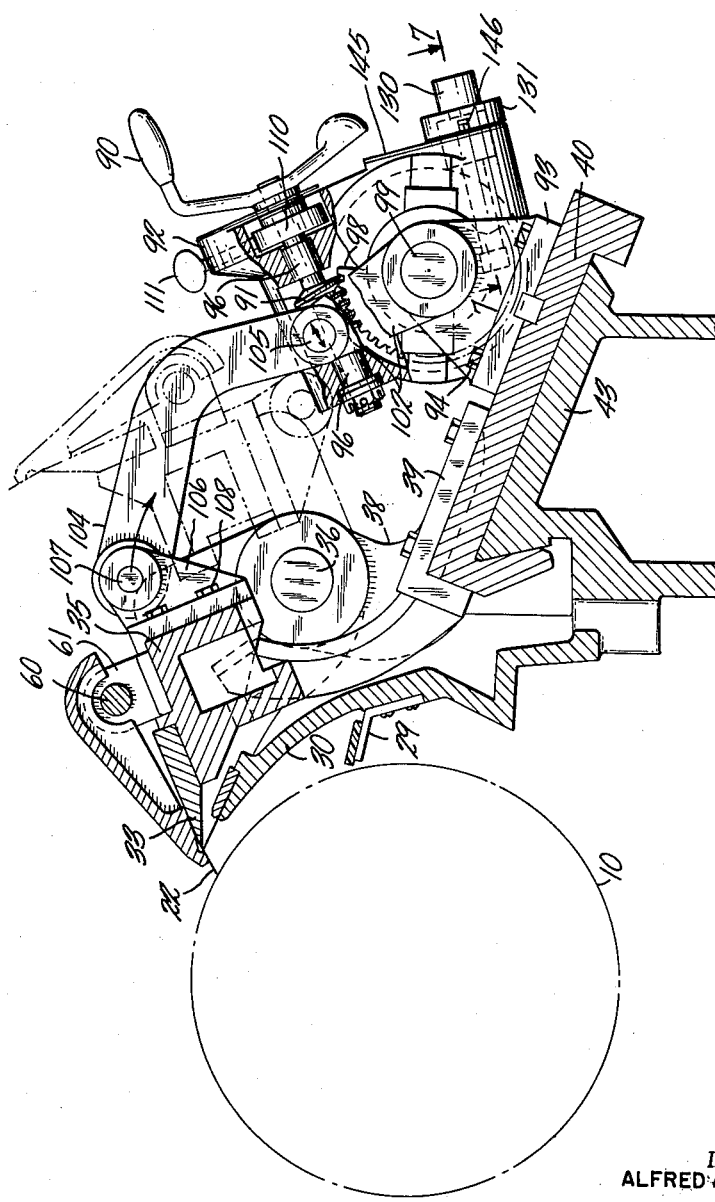
FIGURE 2 is a cross-sectional side elevational view, taken along the line 2—2 of FIGURE 6B, showing the mechanism for moving the doctor blade supporting frame toward and away from the plate cylinder of the printing press.
Figure 5A:
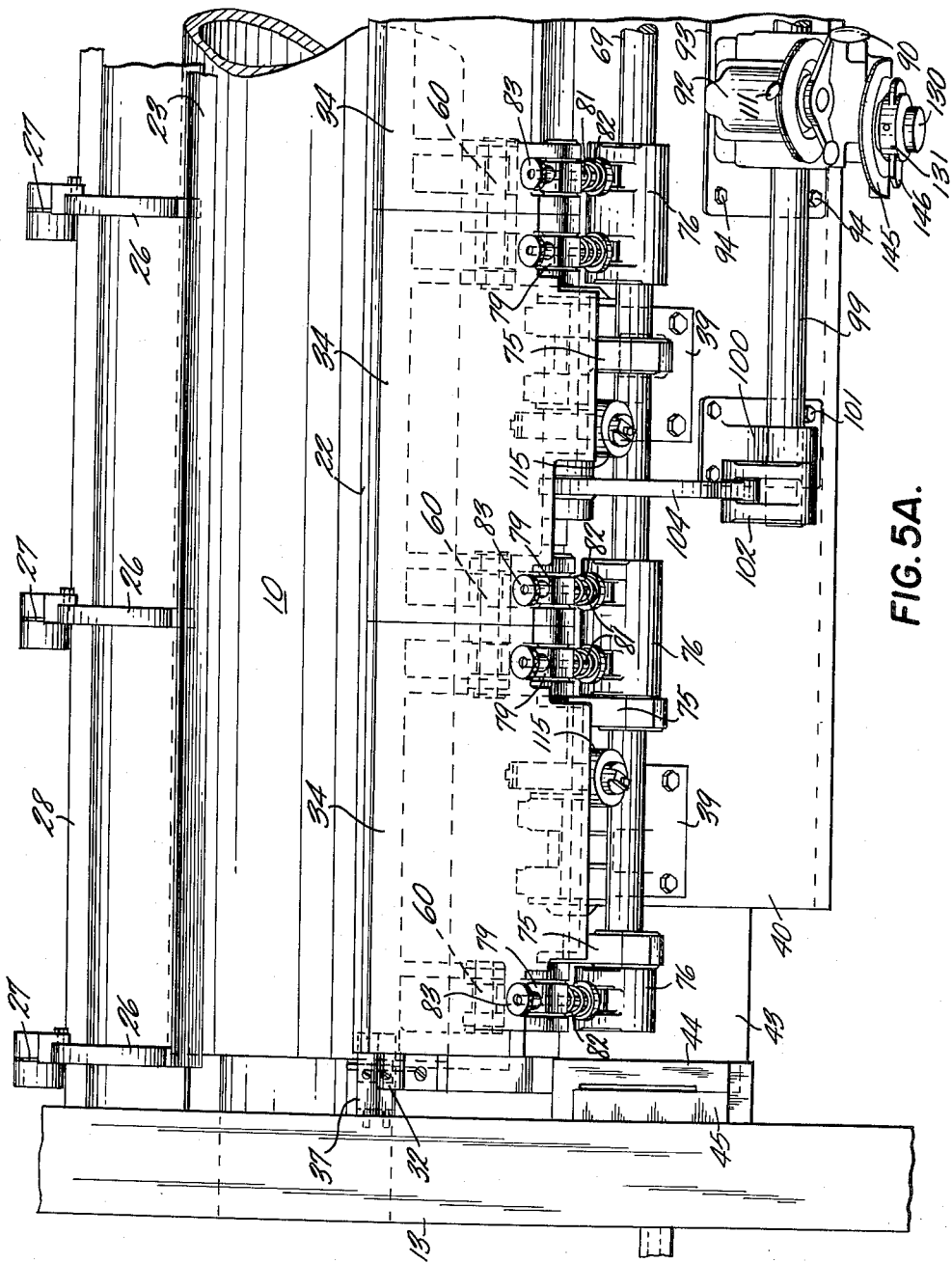
Figure 5B:
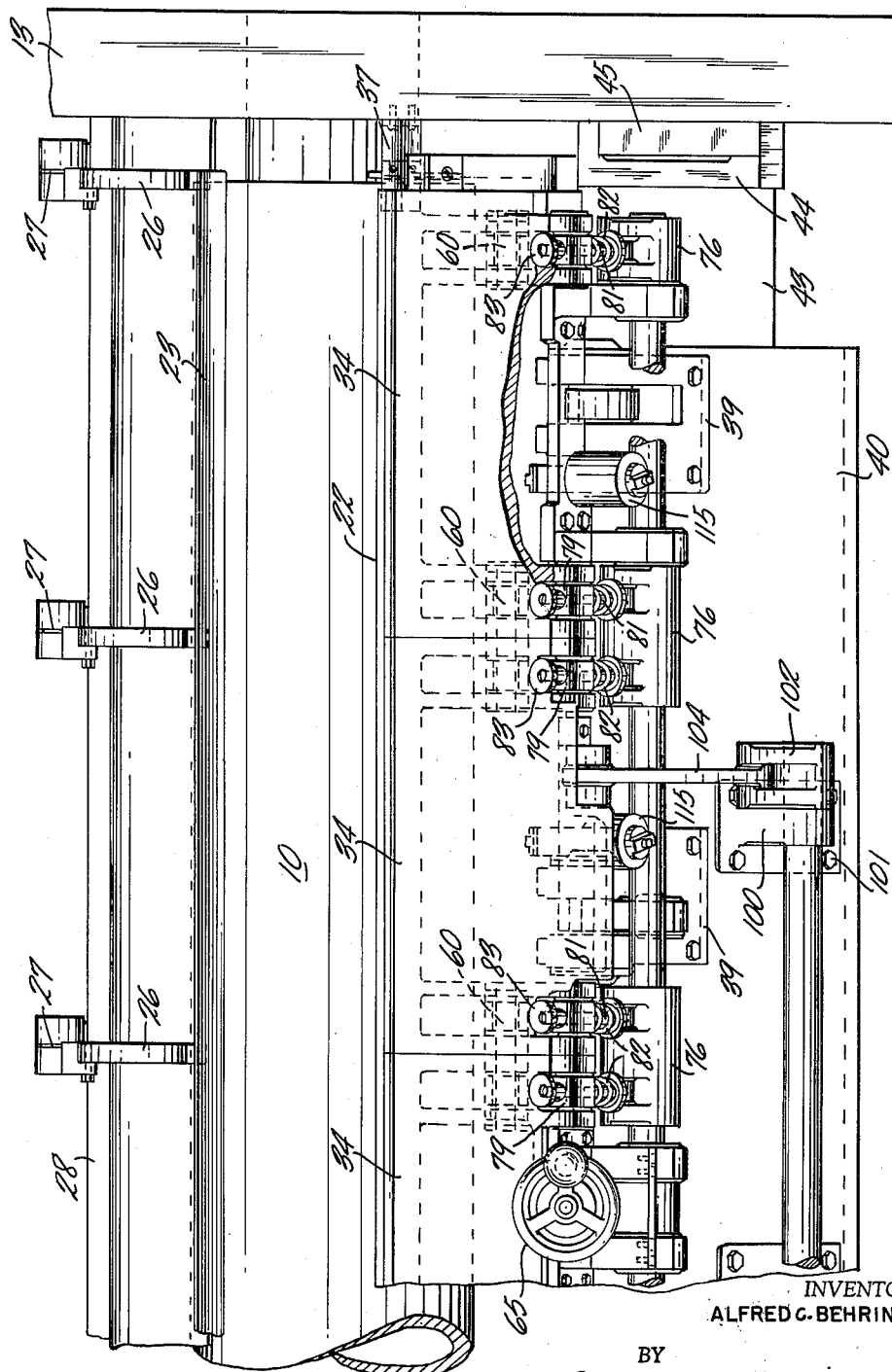
Figure 6B:
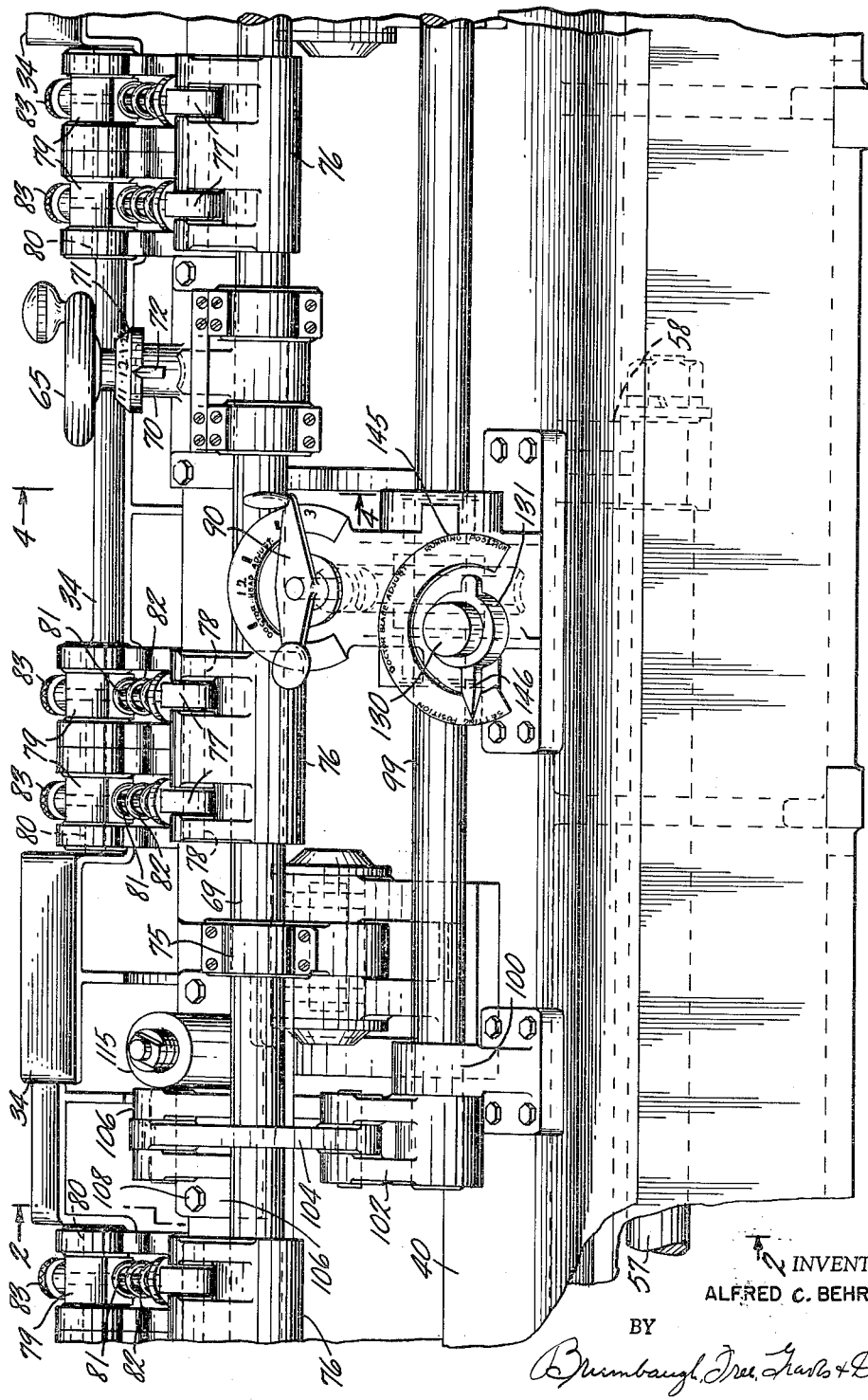
Figure 8:
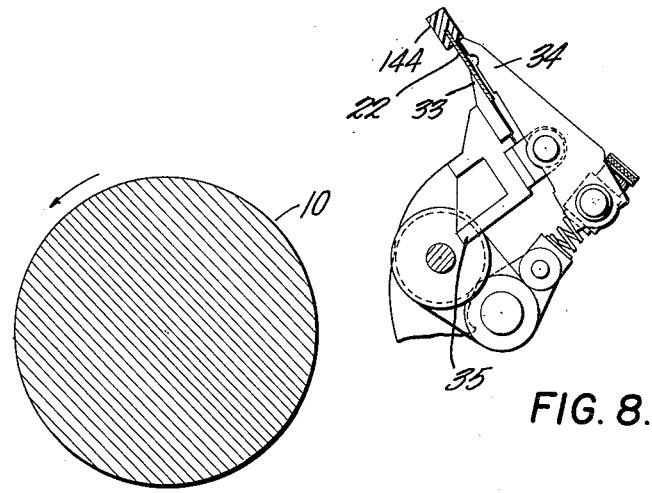
Figure 9:
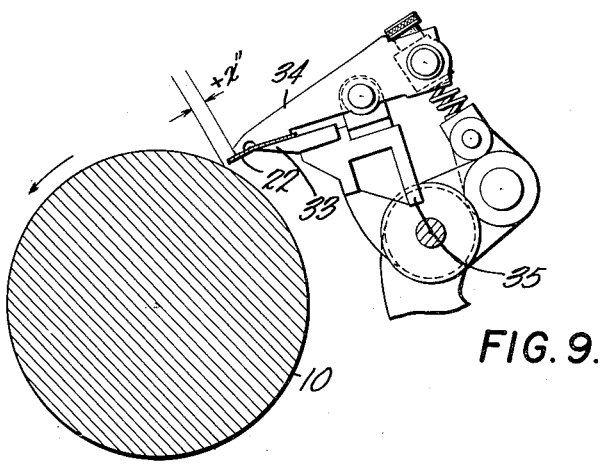
Figure 10:
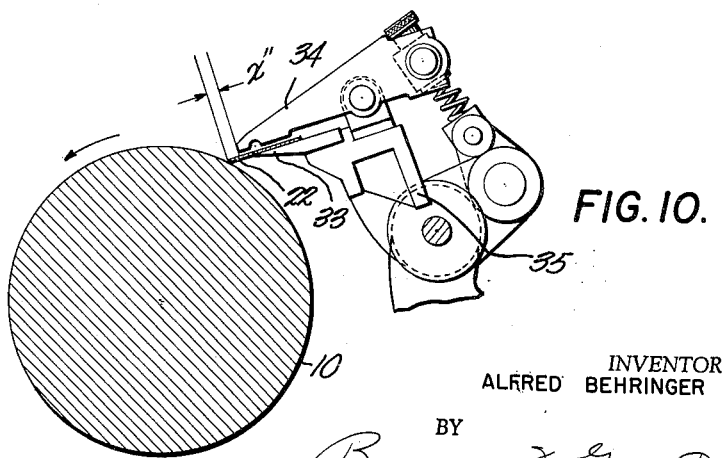

FIGURES 5A and 5B, when taken together, present a plan view of the doctor blade mechanism of the present invention;

FIGURES 6A, 6B and 6C, when taken together, present a front elevational view of the doctor blade mechanism of the present invention;

FIGURE 7 is a cross-sectional view, taken along the line 7—7 of FIGURE 2, looking in the direction of the arrows; and FIGURES 8 to 10 are schematic side elevational views which illustrate the procedure followed in adjusting the doctor blade into proper position.

Figure 1:
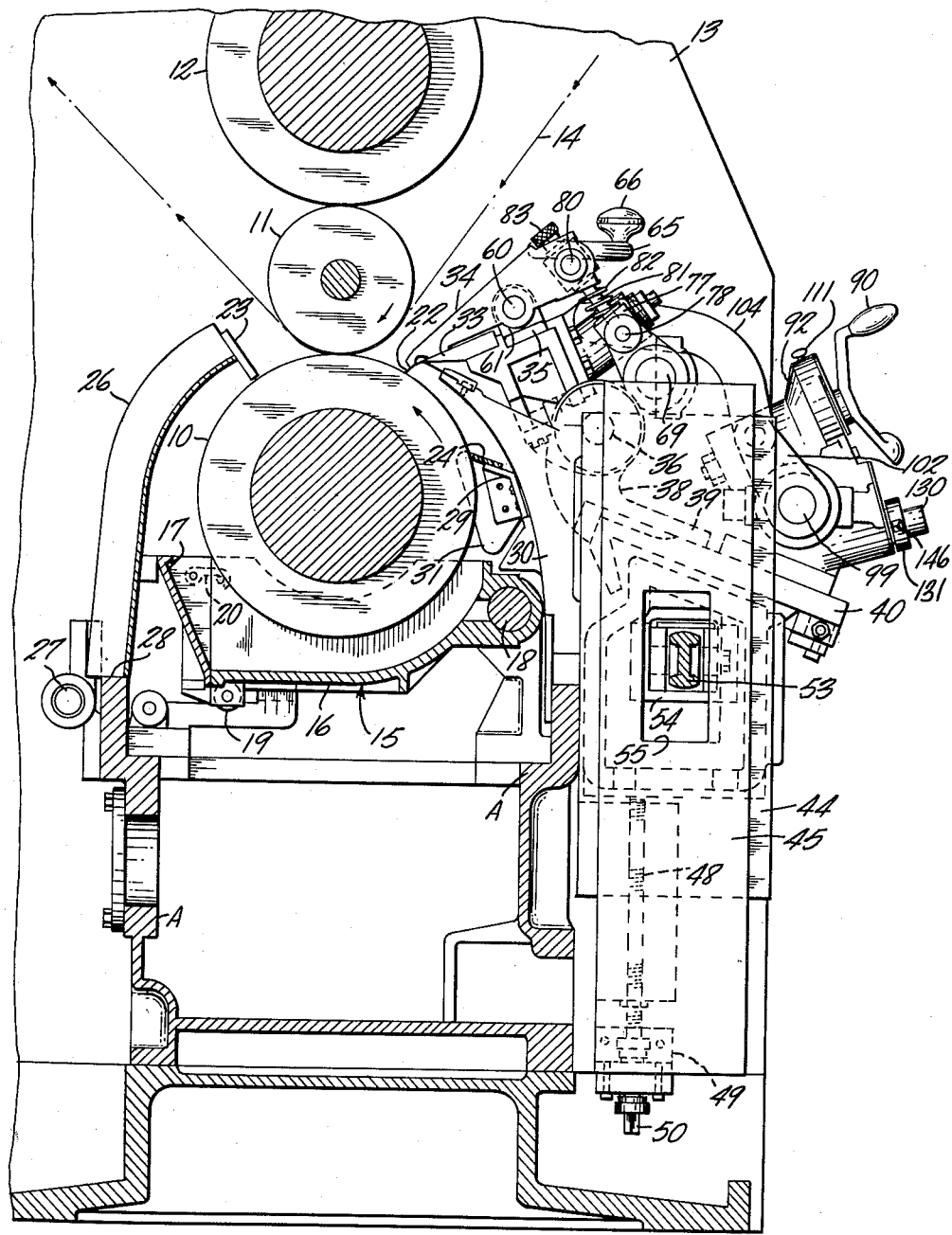
FIGURE 1 is a side elevational view, partly in cross-section, of a printing press equipped with the doctor blade mechanism of the present invention.

Referring to the drawings, and particularly to FIGURE 1, the doctor blade mechanism of the present invention is shown applied to a rotary intaglio printing press in which the cylinders 10, 11 and 12 are rotatably mounted between side walls 13 of a main frame A. The plate cylinder 10 and the impression cylinder 11 form the printing couple between which a paper web 14 is fed. The plate cylinder 10 of the printing press rotates partly submerged in an ink fountain 15. The ink fountain 15 is split into portions 16 and 17. The portion 16 is pivotally mounted to the main frame A of the machine by a shaft 18. The portion 17 of the ink fountain is pivotally connected at its lower end by hinges 19 to the portion 16, and it is locked in operative position by latches 20.

As the plate cylinder 10 rotates in a counterclockwise direction as viewed in FIGURE 1, the ink is wiped and the excess ink removed from the surface of the plate cylinder by a doctor blade 22 before the plate comes into contact with the web 14.

In order that the ink fountain may be effectively sealed, a sealing strip 23 is provided. The sealing strip 23 extends longitudinally of the cylinder 10. The strip 23 is positioned adjacent the discharge side of the printing couple and is fastened to a machined surface of a lightweight, honeycombed, ribbed fountain front cover 26 which is pivotally connected at its lower end to the frame A by hinges 27. In operative position, the lower end of the cover 26 engages and rests upon a seat 28 which is part of the main frame A.

Even before the surface of the cylinder encounters the doctor blade 22, the ink thereon is deflected by a stationary blade 24 which removes most of the ink, leaving only a predetermined film of ink on the cylinder for the doctor blade 22 to wipe off. The deflector blade 24 does not actually wipe the surface of the cylinder, but instead it leaves a predetermined amount of ink coating on the printing cylinder and assures good penetration of the ink into the etched cells. The ink deflector blade 24 prevents lifting of the doctor blade at high speeds and minimizes tone variation when an ink of different viscosity is used. The deflector blade 24, as best shown in FIGURES 1 and 2, is affixed by brackets 29 to the upstanding frame members 30 of the main frame A. The deflector blade 24 can be located in any position between the ink fountain and the doctor blade 22. End shields 31 are also provided at opposite ends of the deflector blade to catch the side splashes from the deflector blade and divert the ink back into the fountain. Although not shown, it may be desirable to mount the deflector blade 24 to a hinged, spring loaded support so that it is yieldably urged against the surface of the cylinder.

Another sealing blade 32 is supported by the upstanding frame members 30. The blade 32 is a resilient strip which is in pressure engagement with the underside of the doctor blade 22. The blade 32 protects the doctor blade holding apparatus and other parts of the doctor blade mechanism from contamination by ink. End seals 37 (see FIGURE 3) are also provided at both ends of the sealing blade 32.

The doctor blade is supported against the upper surface of a lower jaw 33 by a plurality of pivotal upper clamping jaws 34 arranged side by side across the plate cylinder. The lower clamping jaw 33 is a long steel insert which is mounted on a frame 35. The frame 35, in turn, is supported for pivotal movement by a plurality of shafts 36 which are spaced apart along a common axis. The shafts 36 are each supported between upstanding arms 38 of a bracket 39. Each of the brackets, in turn, is secured to a reciprocating frame 40 by bolts 41. The fixed bearing brackets 39 provide a multiple bearing support for the frame 35, a type of support which has not heretofore been possible because of the necessity of adjusting the frame by the displacement of one or both of its two pivots. A multiple bearing support (i.e. a support having more than two bearings) for the frame 35 has been made possible in this construction because parallel adjustment of the doctor blade clamp with respect to the cylinder is accomplished by vertically movable slides 44 and by a unique doctor blade setting procedure to be described below.

The frame 40 is supported upon a stationary rail 43 for reciprocating movement between the side frames 13 of the machine. The rail 43 is supported at opposite ends by the vertically adjustable slides 44 which are movable relative to stationary guide plates or ways 45. The guide plates or ways 45 are, in turn, affixed to the inner walls of the side frames 13 (see FIGURES 5A and 5B). The inner surface of each of the slides 44 is provided with a boss 46 see FIGURE 6A) formed integrally therewith at a distance substantially below the rail 43. The boss 46 is threadably coupled to a threaded rod 48 (see FIGURES 1 and 6A) which is supported for rotation in a bearing 49 of the main frame A of the machine. The threaded rod 48 can be adjusted at its lower end 50 by use of a suitable tool, such as a wrench. The threaded rods 48 make it possible to adjust both the height and level of the rail 43. Since the reciprocating frame 40 is supported on the rail 43 and the pivotal frame 35 which carries the doctor blade 22 is mounted on the reciprocating frame, this adjustment makes it possible to adjust the doctor blade 22 as to height and to insure parallelism between the plate cylinder 10 and the edge of the doctor blade.

The manner in which motion is imparted to the frame 40 is not considered to be part of the present invention. It suffices to say that the reciprocating motion is imparted to the frame 40 by a crank mechanism which is enclosed within the housing 52 (see FIGURE 6A). The crank mechanism is operated by the oscillatory motion of an actuating lever 53 which passes through aligned slots 54, 55 and 56 of the slide 44, the guide 45, and the frame 13, respectively. The oscillatory motion is imparted to the free end of the actuating lever 53 by any suitable driving means. This oscillatory motion is translated into reciprocatory motion by the crank mechanism, and the reciprocatory motion is transmitted to the frame 40 by a rod 57 which is connected by brackets 58 (see FIGURE 3) to the frame 40. The shake of the crank lever is transmitted to the center of the frame 40 by the axial movement of the rod 57, while the angular action of the crank is restricted by a bearing 59 near the frame to make for smooth operation and even wear. The brackets 58 are affixed to the underside of the frame and pass through slots formed in the rail 43. Inasmuch as the pivotal frame 35 which carries the doctor blade 22 is pivotally mounted to the reciprocating frame 40, this reciprocatory motion is also imparted to the doctor blade.

The doctor blade mechanism of the present invention includes means for opening and closing the pivotal clamping jaws 34 in unison. The clamping jaws 34 are each pivotally supported by a pair of pins 60 from upstanding supporting members 61 affixed to the frame 35.

Figure 4:
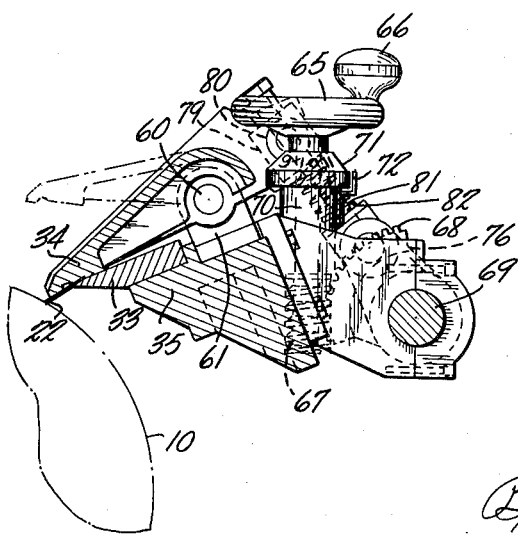
FIGURE 4 is a cross-sectional view, taken along the line 4—4 of FIGURE 6B, illustrating the mechanism for opening and closing the clamping jaws which hold the doctor blade.

The mechanism for opening and closing the pivotal clamping jaws 34 is best described with reference to FIGURES 1, 4 and 6B. A hand wheel 65 serves as the manually operated control means for opening and closing the clamping jaws 34 in unison. The hand wheel is provided with a knob 66 which facilitates the rotation of the hand wheel. Referring to FIGURE 4, the hand wheel is affixed to the upper end of a vertically disposed worm 67. The worm meshes with a rotatable gear segment 68 which is supported on a shaft 69. The worm 67 is mounted for rotation within the housing 70. The rotatable worm shaft 67 carries a collar 71 which serves as a dial or indicator. This dial is read with reference to the upstanding pointer 72 which serves as a fixed reference mark. The pointer is affixed to the housing 70.

The shaft 69 is supported for rotation by a plurality of brackets 75 which accommodate bearings. The brackets 75 are affixed to the pivotal frame 35. The shaft 69 carries a plurality of arms 76 fixedly mounted thereon. The arms 76 intermediate the ends are spaced along the shaft on the line of separation between adjacent clamping jaws 34, and each of these intermediate arms is connected to the adjacent jaws by separate toggle-like linkages. The end arms 76 are connected to the outer sides of the end jaws by a single but similar linkage. The linkages connecting the arms 76 and the clamping jaws 34, as best shown in FIGURES 4 and 6B, each include a block 77 pivotally connected by a pin 78 to the arm 76, a block 79 pivotally connected to the clamping jaw 34 by a pin 80, a rod 81 which connects the blocks 77 and 79, and a compressed spring 82 accommodated on the rod 81 between the blocks 77 and 79. The upper end of each of the rods 81 is provided with a knurled head 83. The rod 81 passes through a hole in the block 79 in relatively loose-fitting relationship. The opposite end of the rod 81 is threadably coupled to the pivotal block 77. The spring 82 acts against the block 79 to urge it into contact with the knurled head 83, so that the rotation of the knurled head 83 will shorten or lengthen the effective length of the link connecting the pivotal blocks 77 and 79.

The above-described mechanism provides an effective and convenient mechanism for opening and closing the clamping jaws 34 in unison. The toggle linkage is shown in FIGURES 1 and 4 in closed position, in which position the axis of the pin 78 lies substantially on a straight line through the axes of the pins 80 and the shaft 69. The rotation of the hand wheel 65 in either direction will impart rotation to the shaft 69 and the arms 76 carried thereby, displacing the pins 78 to one side or the other of the straight line between the axes of the shaft 69 and the pins 80. This has the effect of pivoting the clamping jaws 34 in unison to open position, permitting the doctor blade 22 to be removed therefrom. The gear ratio between the worm 67 and the gear segment 68 is such that it requires approximately six turns of the hand wheel 65 to move the clamping jaws 34 between open and closed positions.

The pivotal frame 35 which carries the doctor blade supporting member 33 and the clamping jaws 34 is adapted to be moved toward and away from the plate cylinder 10 under the control of the rotatable handle 90. As best shown in FIGURE 2, the handle 90 is affixed to a worm 91 which is rotatably mounted in a housing 92. As best shown in FIGURE 5A, the housing 92 is affixed to a bracket 93 which is connected by bolts 94 to the laterally reciprocating frame 40. The worm 91 is provided with journals 96 which are rotatable in bearings of the housing 92. The worm 91 meshes with a gear segment 98 which is affixed to a shaft 99 so that the rotation of the handle 90 imparts rotation thereto.

The shaft 99 is rotatably mounted to the laterally reciprocating frame 40 by the brackets 100. The brackets 100 are attached by bolts 101 to the laterally reciprocating frame 40. Arms 102 are affixed to the extreme ends of the rotatable shaft 99, and curved links 104 connect the arms 102 with the pivotal frame 35. More specifically, the lower ends of the links 104 are pivotally connected by pins 105 to the arms 102. The upper ends of the links 104 are pivotally connected to the brackets 106 (see FIGURE 2) by pins 107. The brackets 106, in turn, are connected by the bolts 108 to the pivotal frame 35.

Thus, in operation, the rotation of the handle 90 imparts rotation to the shaft 99, pivoting the arms 102 affixed thereto. The arms 102, in turn, are connected by the links 104 to the pivotal frame 35. The rotation of the rotatable handle 90 in one direction pivots the frame 35 about the axis of the shaft 36 to the position indicated in phantom lines in FIGURE 2. The rotation of the handle 90 in the opposite direction pivots the frame 35 and the doctor blade 22 toward and into engagement with the surface of the plate cylinder 10. The gear ratio between the worm 97 and the gear segment 98 is such that approximately thirty turns of the handle 90 are required to pivot the frame 35 from its operative to its inoperative position, or that is to say, through an angle of approximately 90°.

As best shown in FIGURE 2, the worm 91 carries a disc 110 thereon. The housing 92 accommodates a threaded locking screw 111 which has a flattened head, permitting the locking screw to be tightened or loosened. The end of the screw 111 opposite the flattened head engages the outer periphery of the disc 110, locking the handle 90 and the shaft 91 in an adjusted position. If desired, the outer periphery of the shaft 110 may be roughened to provide a more effective locking action.

Figure 3:
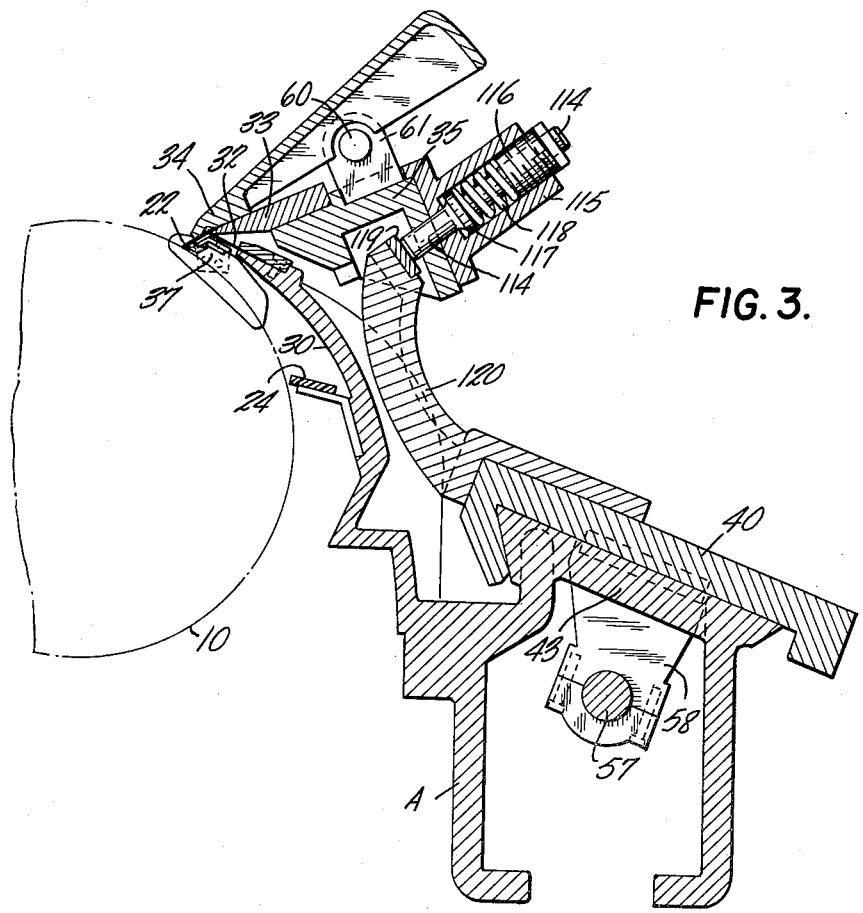
FIGURE 3 is a cross-sectional side elevational view taken along the line 3—3 of FIGURE 6A, showing one of the resilient bumpers which helps locate the doctor blade supporting frame in operative position.

In order to counterbalance the weight of the pivotal frame 35 and to assure that backlash and play are eliminated from the gears and linkages controlling its adjustment before the doctor blade 22 comes into contact with the cylinder 10, the pivotal frame 35 carries a plurality of spring-pressed bumper rods 114 (see FIGURE 3). The bumper rods 114 have discs 117 formed integrally therewith which are accommodated in the hollow bores of cylindrical sleeves 115. An annular guide plug 116 is threadably coupled to one end of each of the sleeves, and the end of the bumper rod opposite its bumper end is guided for axial movement thereby. The sleeve 115 accommodates a compression spring 118 which is interposed between the disc 117 and the guide plug 116. The action of the compressed spring 118 is such that it urges the retaining disc 117 into engagement with the end of the bore in the sleeve 115 opposite the guide plug 116. The bumper end of the rod 114 passes through a suitable hole formed in the pivotal frame 35, so that when the frame 35 is pivoted to operative position, the bumper end of the rod comes into engagement with a bumper plate 119 affixed to the upper end of a curved arm 120. The arm 120 is, in turn, affixed to and carried by the laterally reciprocating frame 40.

When the pivotal frame 35 is moved to its operative position by the rotation of the handle 90, the bumper rods engage the bumper plates 119 compressing the springs 118 as the doctor blade 22 nears its operative position in engagement with the surface of the plate cylinder 10. The operator is thus forewarned of the fact that the doctor blade is approaching its operative position in engagement with the plate cylinder. The retarding action caused by the compression of the springs 118 helps prevent damage which may be caused by bringing the doctor blade into violent contact with the plate cylinder. Moreover, it is apparent that any play in the mechanism which imparts the pivotal movement to the frame 35 is taken up by the spring-pressed bumper rods 114. Also, the compressed springs 118 tend to take up any vibrations and to prevent vibrations from being transmitted to the doctor blade 22.

The present invention provides an adjustable stop device which plays an important role in the setting of the doctor blade and makes it possible to restore the pivotal frame 35 to a pre-set position. As best shown in FIGURE 7, adjustable stop 126 is movable into or out of the path of a projecting shoulder 127 carried by the gear segment 98. As explained above, the rotation of the handle 90 imparts rotation to the gear segment 98 through a rotatable worm 97. The rotation of the gear segment 98, in turn, imparts pivotal movement to the frame 35 about the pins 36. When the stop 126 is in the operative position indicated by the broken lines in FIGURE 7, it is interposed in the path of the shoulder 127, and the engagement of the shoulder 127 with the stop will determine the adjusted position of the pivotal frame 35. The position of the stop 126, in turn, can be adjusted with precision in a manner about to be described.

The stop 126 is carried eccentrically and at the end of a shaft 128 which is both rotatable and axially displaceable. The axial displacement of the shaft 128 and the stop 126 carried thereby is controlled by the rotation of a knurled knob 130. The rotation of the shaft 128 to move the eccentric stop 126 between the inoperative position illustrated in solid lines in FIGURE 7 and the operative position illustrated in broken lines in the same figure is accomplished by the rotation of a knob 131. The knob 131 is affixed to a sleeve 132 which is rotatably mounted in the housing 92. The sleeve 132 is internally threaded and the threads are provided with longitudinal grooves or splines. A disc 135 is threaded within the sleeve 132. A disc 136 is affixed to the end of the shaft 128 opposite the stop 126. The disc 136 is splined but not threadably coupled to the inside of the sleeve. The splines guide the disc 136 for axial displacement. The disc 136 is urged into engagement with the disc 135 by a compressed spring 137 accommodated within the end of the sleeve and acting on the disc 136. A non-circular shaft 138 extends from the opposite face of the disc 135. The non-circular shaft 138 is accommodated within a complementary bore 139 within the knurled knob 130.

The knurled knob 130 is provided with an outwardly projecting flange 140 which is accommodated for sliding movement within the extreme end of the sleeve 132. This end of the sleeve 132 is neither splined nor threaded, so as to permit limited sliding movement of the flange portion of the knob axially of the sleeve. A compressed spring 141 accommodated within the sleeve between the disc 135 and the knob 130 urges the knob into engagement with the inner periphery 142 of the handle 131 which serves as a retaining ring for the knob 130. The opposing faces of the flange 140 and the inner periphery 142 of the knob 131 are provided with radial grooves or teeth so that when they are interlocked, rotation imparted to one of the knobs 130 and 131 will also impart rotation to the other. However, when the knob 130 is depressed, moving it along the non-circular shaft 138 against the action of the spring 141, the knob 130 is disconnected from the knob 131. When so disconnected, the rotation of the knob 130 will impart rotation to the disc 135 but will not impart rotation to the knob 131.

The knob 130 is provided with a marking or pointer which can be adjusted relative to a scale or other indicia formed on the face of the knob 131 which surrounds the knob 130. This scale indicates the size of the gap between the edge of the clamping jaw 34 and the surface of the cylinder 10 when the pivotal frame 35 is adjusted to bring the shoulder 127 into engagement with the stop 126 in operative position.

As explained above, the rotation of the knob 131 between operative and inoperative positions rotates the entire housing 132 and, therefore, does not change the axial position of the stop 126. Moreover, the interlocking action between the knobs 130 and 131 maintains the knob 130 in fixed position relative to the knob 131 when the knob 131 is adjusted between operative and inoperative positions. Thus, the adjustment of the knob 131 does not disturb the setting of the knob 130.

By means of the above-described adjustable stop device, the pivotal frame 35 can be accurately adjusted to a desired position relative to the cylinder 10. Moreover, once the pivotal frame 35 and the clamping jaws 34 have been pre-set to the desired position with the desired gap established between the plate cylinder 10 and the ends of the clamping jaws 34 in proximity thereto, the stop 126 can be adjusted to a position which will thereafter facilitate the relocation of the pivotal frame to this position of adjustment. This is accomplished with the stop in a retracted position relative to the shoulder 127 by rotating the stop 126 to the operative position by the manipulation of the knob 131. The knob 130 is then depressed and rotated to thread the disc 135 further into the sleeve 132. This displaces the disc 135 axially until the stop 126 engages the shoulder 127 of the gear segment. With the stop 126 thus adjusted into operative position, the stop 126 will thereafter help to relocate the pivotal frame 35 and clamping jaws 34 in their operative position in the event it becomes necessary to move the pivotal frame from its pre-set position.

The stop 126 can be moved to inoperative position by the rotation of the knob 131 while retaining its pre-set axial position. The rotation of the knob 131 bodily rotates the entire sleeve assembly, including the knob 30, and therefore, does not displace the disc 135 relative to the sleeve.

As best shown in FIGURE 6B, the housing 92 has mounted thereto a dial 145 which, when read with the pointer 146 of the knob 131, serves to indicate whether the stop is in operative or inoperative position. As shown in FIGURE 7, the knob 131 is readily located in its operative and inoperative positions by a spring-urged ball detent 147.

The operation of the doctor blade mechanism of the present invention will be described in connection with the procedure which is followed in introducing and adjusting a doctor blade in the mechanism. The procedures can be followed by reference to FIGURES 8 to 10 of the drawings. For purposes of this explanation, it will be assumed that the pivotal frame 35 is in the retracted position with the clamping jaws 34 open, as shown schematically in FIGURE 8 and indicated in phantom lines in FIGURE 2. The doctor blade is inserted between the lower jaw 33 and the adjustable upper clamping jaws 34. As shown in FIGURE 8, the wiping edge of the blade will ordinarily be protected by a sheath 144 which prevents damage to the carefully ground edge of the blade. When the blade is positioned by the abutment of the protective sheath against the forward edges of the clamps which are upwardly disposed in the position shown in FIGURE 8, the blade is approximately accurately positioned. The clamping jaws 34 are then closed by the rotation of the hand wheel 65 locking the doctor blade in place and the protective sheath 144 is removed from the edge of the blade.

The proper setting of the doctor blade 22 relative to the outer periphery of the plate cylinder 10 is a matter of extreme importance to the proper functioning thereof. One of the most critical adjustments of the doctor blade is the amount of protrusion of the doctor blade beyond the upper clamping jaws 34 because this determines the relative flexibility or rigidity of the doctor blade in its wiping operation. Normally, the doctor blade is set relative to the upper clamping jaw such that the wiping edge of the doctor blade projects a predetermined distance, say $x''$ as shown in FIGURE 10, beyond the forward edge of the clamping jaw. Assuming that it is desired to lock the blade in position such that it protrudes $x''$ beyond the forward edges of the upper clamps 34, the stop 126 is moved into operative position by the adjustment of the knob 131 and set to the $x''$ marking on a scale on the knob 131 by the adjustment of the knob 130. The pivotal frame 35 is then moved toward the plate cylinder 10 by the rotation of the hand wheel 90 until the wiping edge of the blade is in proximity to the outer periphery of the cylinder, but slightly more than $x''$, say $+x''$ as shown in FIGURE 9. In practice $x''$ might be $\frac{3}{8}''$ and $+x''$ might be $\frac{7}{16}''$. The clamping jaws are then partially released to a certain setting on the dial to permit the doctor blade to slip and the pivotal frame 35 is moved slowly by the rotation of the handle 90 until the shoulder 127 of the gear segment 98 comes into contact with the stop 126. During this operation, the wiping edge of the blade comes into contact with the surface of the plate cylinder, insuring parallelism between the edge of the doctor blade and the plate cylinder, and the doctor blade remains in registration with the outer surface of the plate cylinder while the pivotal frame 35 is moved to its final position of adjustment as determined by the stop 126. The clamping jaws 34 are then locked tightly and the pivotal frame 35 is backed away from the plate cylinder to relieve the friction on the stop 126 so that the stop can be moved to inoperative position by turning the knob 131. The frame 35 can then be moved toward the plate cylinder, bringing the edge of the doctor blade into the desired pressure engagement with the outer surface of the plate cylinder to obtain the desired tone reproduction without interference from the adjustable stop 126.

It is noteworthy that throughout the above-described blade setting procedure the cylinder 10 is standing still. Thus, it is possible to set the blade as soon as the cylinder is installed in the printing couple. This is an important advantage over the blade setting procedures heretofore in use which required the press to be operating so as to permit the wiping action to be inspected during the setting of the blade, since it greatly cuts down the makeready time.

In the event that it becomes necessary or desirable to move the pivotal frame 35 away from the plate cylinder 10, for example, to check the condition of the wiping edge of the doctor blade, the stop 126 can be used to help the operator restore the pivotal frame to its initial position. Toward this end, the stop can be moved into engagement with the shoulder 127 before the pivotal frame is moved to retracted position.

The function of the bumpers 114 might be referred to briefly in connection with the movement of the pivotal frame 35 into operative position. When the pivotal frame is about 3/32" to 1/8" away from its final adjusted position the bumper 114 engages the striker plate 119. The yielding of the bumpers 114 against the force exerted by the springs 118 helps support the weight of the heavy pivotal frame and takes all play, lost motion and backlash out of the bearings, links, gears, etc. It also forewarns the operator that he is approaching the operative position.

The invention has been shown in preferred form only, and by way of example, and obviously many variations and modifications may be made therein without departing from the spirit of the invention. The invention, therefore, is not to be limited to any specified form or embodiment except insofar as such limitations are set forth in the claims.

I claim:

1. A doctor blade apparatus for a rotary printing press which includes a rotary cylinder comprising a frame mounted adjacent the cylinder for movement toward and away from the cylinder, means for moving the frame toward and away from the cylinder, a doctor blade clamp carried by the frame, means for opening and closing the clamp, and an adjustable stop device to facilitate positioning of the frame relative to the cylinder, said adjustable stop device including a housing, a member accommodated within said housing for both rotary and axial displacement, a stop carried by the member eccentrically of the axis of rotation thereof, a threaded disc accommodated within the housing, means urging the rotary and axially displaceable member into engagement with said threaded disc, a control means for imparting rotation to the threaded disc to axially displace the member and the stop, and control means to impart rotation to the stop to move it between operative and inoperative positions.

2. A doctor blade apparatus as set forth in claim 1, in which the housing is rotatably mounted and including means connecting the housing to the control means which imparts rotation to the stop, whereby the adjustment of the said control means imparts rotary motion to the housing and to the member accommodated therein.

3. A doctor blade apparatus as set forth in claim 1, in which both control means are controls which are rotatable on a common axis and including indicia carried by both of the controls to permit one to be adjusted with reference to the other, interlocking means coupling the controls so that they can be maintained in fixed relation when the stop is moved between operative and in operative positions without disturbing the axial position of the stop, and means urging them into interlocking relationship, the controls being relatively movable axially to disconnect them to permit axial displacement of the stop without rotation.

4. A doctor blade apparatus for a printing press which includes a rotary cylinder comprising a frame mounted adjacent the cylinder for movement toward and away from the cylinder, means for moving the frame toward and away from the cylinder, a doctor blade clamp carried by the frame, means for opening and closing the clamp, an adjustable stop for limiting the movement of the frame toward the cylinder to a position in which a blade locked in the doctor blade clamp is in non-pressure engagement relationship with the cylinder, means for mounting the adjustable stop both for rotation and axial displacement, a manually adjustable control for imparting axial displacement to the stop and a manually adjustable control for imparting rotation to the stop without disturbing the axial position of the stop.

5. A doctor blade apparatus as set forth in claim 4, in which both of said manually adjustable controls are mounted on a common axis and including means coupling the manually adjustable controls to maintain them in fixed relative position when the one control is adjusted to impart rotation to the stop but permitting the controls to be uncoupled when it is desired to adjust the control which imparts axial displacement to the stop.

6. An adjustable stop device for adjusting a doctor blade supporting frame relative to a main frame, comprising a rotatable housing, a manually adjustable control for imparting rotation to the housing, an element adjustable along the axis of the housing, a manually adjustable control operatively connected to said element to displace it axially, and a stop carried eccentrically of the axis of rotation of the housing, whereby the stop can be adjusted to desired axial setting by the one control and rotated to operative and inoperative positions by the other control without disturbing the setting.

7. An adjustable stop device as set forth in claim 6, including disengageable means coupling the controls, said coupling preventing relative movement between the controls to change the setting of the stop when the stop is moved between operative and inoperative positions, and markings carried by the controls to facilitate the adjustment of one of the controls relative to the other when they are disengaged to change the setting of the stop.

8. A method of adjusting a doctor blade in a clamping jaw of a frame which is movable toward and away from the cylinder of a printing press comprising the steps of moving the frame away from the cylinder to a position in which the clamping jaw is upwardly disposed, placing a protective sheath on the wiping edge of the doctor blade, inserting the doctor blade in the open clamping jaw, registering the doctor blade therein by bringing the protective sheath into abutment with the edge of the clamping jaw, closing the clamping jaw, removing the protective sheath, moving the frame toward the cylinder, bringing the edge of the blade into close proximity with the cylinder, setting an adjustable stop for the frame to a position to attain the desired protrusion of the doctor blade from the clamping jaw, loosening the clamping jaw to permit the blade to slip therein, moving the frame toward the cylinder, bringing the edge of the blade into registration with the cylinder to produce parallelism between the edge of the blade and the surface of the cylinder, continuing the movement of the frame toward the cylinder until the frame comes into engagement with the stop, and closing the clamping jaw to prevent slipping movement of the doctor blade relative to the clamping jaw.

9. A method of adjusting a doctor blade in a clamping jaw of a frame which is movable toward and away from the cylinder of a printing press comprising the steps of placing a protective sheath on the wiping edge of the doctor blade before inserting the doctor blade in the clamping jaw, inserting the blade within the clamping jaw until the protective sheath abuts against the edge of the clamping jaw, closing the clamping jaw, removing the protective sheath, moving the frame with the blade locked in the clamping jaw toward the cylinder until the clamping jaw is separated from the outer surface of the cylinder by a gap which exceeds the distance which the edge of the doctor blade is to protrude therefrom, loosening the clamping jaw to permit the wiping edge of the blade to come into contact with the outer surface of the cylinder, moving the frame and clamping jaw toward the cylinder with the blade slipping therein until the clamping jaw is separated from the surface of the cylinder by a gap which is equal to the distance which the edge of the blade is to protrude from the clamping edge, closing the clamping jaw to lock the blade tightly therein, and moving the frame an additional increment toward the cylinder to bring the doctor blade into pressure engagement with the cylinder.

10. In a method of adjusting a flexible blade in a clamping jaw of a frame which is movable toward and away from a cylinder and in which an adjustable stop is provided to facilitate adjustment of the frame comprising the steps of loosely clamping the blade in the clamping jaw with the edge of the blade projecting from the clamping jaw a distance greater than that desired, setting the adjustable stop to a setting which will afford the desired projection of the blade from the clamping jaw, moving the frame toward the cylinder to a position determined by the setting of the adjustable stop, thereby bringing the edge of the blade into engagement with the cylinder to align the edge of the blade therewith and displace the blade relative to the clamping jaw and to achieve the desired projection of the blade edge with respect to the clamping jaw, tightening the clamping jaw to lock the blade firmly therein, and removing the adjustable stop to permit the frame and the clamping jaw to be moved closer to the cylinder so that the desired pressure is obtained between the blade and the cylinder.

11. A doctor blade apparatus comprising a cylinder, a frame mounted for movement toward and away from the cylinder, a blade clamp carried by the frame, means for moving the frame toward and away from the cylinder between a retracted position in which a blade properly clamped within the blade clamp is out of contact with the cylinder and an operative position in which the blade is in pressure engagement with the cylinder, an adjustable stop movable between operative and inoperative positions located with respect to the frame to intercept the frame in a position intermediate said retracted and operative positions of the frame in which intermediate position the blade may be aligned in the blade clamp in non-pressure engagement with the cylinder, and means for moving the stop to inoperative position without disturbing the setting thereof so that the frame can be moved to its operative position.

12. A blade adjusting mechanism for an apparatus which includes a rotatable cylinder comprising an adjustable frame, a supporting structure to which the frame is mounted for movement toward and away from the cylinder, a blade clamp carried by the adjustable frame for clamping a blade therein, means for imparting movement to the frame from a retracted position in which the blade is out of contact with the cylinder to an operative position in which the blade is in pressure engagement with the cylinder, and a stop movable between operative and inoperative positions and located with respect to the frame so that in the operative position of the stop the frame is intercepted intermediate said operative and retracted positions of the frame in which intermediate position the blade may be adjusted in the blade clamp to a position of uniform engagement with the cylinder while in non-pressure engagement with the cylinder and in the inoperative position of the stop the frame can be adjusted to its operative position.

13. A blade adjusting mechanism for an apparatus which includes a rotatable cylinder comprising an adjustable frame movable toward and away from the cylinder, a blade clamp carried by the adjustable frame for holding a blade, means for adjusting said frame from a retracted position in which the blade is out of contact with the cylinder to an operative position in which the blade is in pressure engagement with the cylinder, and cooperating frame-locating elements for locating the frame in an intermediate position between the operative and retracted positions of the frame in which position the blade may be aligned in the blade clamp while in proximity to the cylinder but in non-pressure engagement with the cylinder, one of said elements being movable with the frame into contact with the other, at least one of said elements being movable out of the path of the other to permit the frame to be moved to its operative position.

14. A blade adjusting mechanism as set forth in claim 13 in which one of the frame-locating elements is adjustable to change the said intermediate position of the frame.

15. A doctor blade apparatus comprising a cylinder, a reciprocatory supporting structure adjacent said cylinder, said supporting structure being movable in directions parallel with the axis of said cylinder, an adjustable frame mounted to said reciprocatory supporting structure for movement toward and away from the cylinder, control means carried by the reciprocatory supporting structure for adjusting the position of the frame relative to the cylinder, means operatively connecting the control means and the adjustable frame, a blade clamp carried by the adjustable frame for clamping a blade therein with its operative edge exposed to engage the outer periphery of the cylinder, said adjustable frame being movable between a retracted position in which a blade properly clamped within the blade clamp is out of contact with the cylinder and an operative position in which the blade is in pressure engagement with the cylinder, control means carried by the frame for opening and closing the blade clamp, a retractable stop located with respect to the frame to intercept the frame at a position intermediate said retracted and operative positions of the frame in which intermediate position the blade may be adjusted in the blade clamp while in close proximity to but in non-pressure engagement with the cylinder, and means for adjusting the setting of said stop to an inoperative position without disturbing the setting of the stop so that the frame can be moved to its operative position.

16. A doctor blade apparatus as set forth in claim 15 in which the control means for opening and closing the blade clamp is operatively connected thereto by a toggle link which includes a spring urging the blade clamp to closed position.

17. A doctor blade apparatus as set forth in claim 15 including resilient bumpers which are engageable with a surface as the adjustable frame nears its operative position.

18. A doctor blade apparatus as set forth in claim 16 in which one link of the toggle linkage is adjustable as to length.

19. A doctor blade apparatus for a printing press which includes a rotary cylinder comprising a frame carrying a blade and mounted adjacent the cylinder for movement between a retracted position in which the blade is out of contact with the cylinder and an operative position in which the blade is in pressure engagement with the cylinder, a stop for intercepting the frame in its movement toward the cylinder at a position intermediate said retracted and operative positions of the frame in which said clamp is in proximity to the cylinder, a control means for adjusting the setting of the stop, a scale indicating the gap between the clamp and the cylinder when the frame is in the position determined by the stop, and means for moving said stop to an inoperative position without changing the setting of the stop so that the frame can be moved to its operative position.

20. A doctor blade apparatus as set forth in claim 19 in which the adjustable stop is carried by a member mounted both for rotation and axial displacement.

References Cited in the file of this patent

UNITED STATES PATENTS

| 391,178 | Miehle | Oct. 16, 1888 |
| 1,011,009 | Bakke | Dec. 5, 1911 |
| 1,461,719 | Armstrong | July 17, 1923 |
| 2,178,069 | Crafts | Oct. 31, 1939 |
| 2,461,214 | Holms | Feb. 8, 1949 |
| 2,637,270 | Bamford | May 5, 1953 |
| 2,638,844 | Halley | May 19, 1953 |
| 2,644,395 | Peyrebrune | July 7, 1953 |